US006073228A

United States Patent [19]

Holmqvist et al.

[11] Patent Number: 6,073,228

[45] Date of Patent: Jun. 6, 2000

[54] MODULO ADDRESS GENERATOR FOR GENERATING AN UPDATED ADDRESS

[75] Inventors: Carl R. Holmqvist, Bangor, Pa.; Douglas J. Rhodes, Long Valley, N.J.; Larry R. Tate, South Barrington, Ill.; Mark Ernest Thierbach, South Whitehall Township, Lehigh County, Pa.

[73] Assignee: Lucent Technologies Inc., Murray Hill, N.J.

[21] Appl. No.: 08/932,977

[22] Filed: Sep. 18, 1997

[51] Int. Cl.[7] .......... G06F 12/00

[52] U.S. Cl. .......... 711/217; 711/219; 711/211; 711/200

[58] Field of Search .......... 711/200, 201, 711/202, 211, 212, 213, 217, 219

[56] References Cited

U.S. PATENT DOCUMENTS

| | | | |
|---|---|---|---|
| 4,202,035 | 5/1980 | Lane | 364/200 |
| 4,800,524 | 1/1989 | Roesgen | 364/900 |
| 4,809,156 | 2/1989 | Taber | 364/200 |
| 4,833,602 | 5/1989 | Levy et al. | 364/900 |
| 4,908,748 | 3/1990 | Pathak et al. | 364/200 |
| 4,935,867 | 6/1990 | Wang et al. | 364/200 |
| 5,381,360 | 1/1995 | Shridhar et al. | 364/746 |
| 5,507,027 | 4/1996 | Kawamoto | 395/375 |
| 5,623,621 | 4/1997 | Garde | 395/421.1 |
| 5,721,855 | 2/1998 | Hinton et al. | 395/394 |

*Primary Examiner*—Tuan V. Thai
*Attorney, Agent, or Firm*—David L. Smith

[57] ABSTRACT

A modulo address generation circuit for generating multiple-word memory accesses for use in a computer system. The circuit includes an address pointer latch for retaining a current address pointer, an adder for receiving the current address pointer as a first input and a displacement as a second input. The adder for adding the inputs to provide an output. A comparator compares the current address pointer to an ending address of a circular buffer ignoring least significant bits thereof when the displacement is greater than one. The comparator provides an output that is a first state when the inputs are the same and an output that is a second state when the outputs are different. A control circuit is adapted to receive an indicator of the beginning address of the circular buffer, an indicator of the current address pointer, and an indicator of the ending address of the circular buffer. The control circuit provides the output of the adder to the address pointer latch as an updated address pointer when the indicators take on predetermined values and the comparator output is in the second state. The control circuit provides the beginning address to the address pointer latch as an updated address pointer when the indicators take on predetermined values and the comparator output is in the first state. An advanced address pointer may be used to enhance performance in misaligned memory accesses.

15 Claims, 5 Drawing Sheets

| CASE | BEGINNING ADDRESS LSB | ENDING ADDRESS LSB | ADDRESS POINTER LSB |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

| 80 | | |
|---|---|---|
| | 8 | 9 |
| 30 | 10 | 11 |
| | 12 | 13 |
| | 14 | 15 |
| | 16 | 17 |
| | 18 | 19 — 48 |
| | 20 | 21 |

} 70

| | 8 | 9 | — 80 |
|---|---|---|---|
| 30 | 10 | 11 | |
| | 12 | 13 | |
| | 14 | 15 | |
| | 16 | 17 | |
| | 18 | 19 | — 48 |
| | 20 | 21 | |

} 70

| | 8 | 9 | — 80 |
|---|---|---|---|
| | 10 | 11 | — 30 |
| | 12 | 13 | |
| | 14 | 15 | |
| | 16 | 17 | |
| 48 — | 18 | 19 | |
| | 20 | 21 | |

} 70

MODULO ADDRESS GENERATOR FOR GENERATING AN UPDATED ADDRESS

TECHNICAL FIELD

This application relates generally to modulo address generation for microprocessors and digital signal processors, and in particular to modulo address generation for multiple-word memory accesses.

BACKGROUND OF THE INVENTION

Many applications performed on microprocessors or digital signal processors require the generation of addresses to fetch data from memory. One such application requires a finite portion of memory to appear as a circular buffer, such that data stored in a contiguous, finite portion of a memory array appears to be endless. The addressing technique used for circular buffers, known as modulo addressing, provides that an address stored in an address pointer will be incremented or decremented by a predetermined displacement for each memory access until a beginning or ending address boundary is reached or exceeded. When a beginning or ending address boundary is reached or exceeded, the address pointer for the next memory access will “wrap-around” to the other end of the address range of the finite array.

Known modulo addressing techniques are described in U.S. Pat. Nos. 5,623,621, 4,908,748, and 4,800,524 which are hereby incorporated by reference. Present modulo addressing techniques are designed to access memory for single-word fetches where the memory is one word wide such that each memory access is aligned with the word being fetched.

A need exists for a modulo addressing technique to accommodate multiple-word fetches, such as double-word fetches, where a single element of memory may hold more than one word. In such applications, the data may or may not be aligned.

SUMMARY OF THE INVENTION

In accordance with the present invention, an address pointer latch is adapted to retain a current address pointer. An adder is adapted to receive the current address pointer as a first input and a displacement as a second input. The adder is adapted to add the inputs to provide an output. A comparator compares the current address pointer to an ending address of a circular buffer. The comparator provides an output that is a first state when the inputs are the same and an output that is a second state when the outputs are different. A control circuit is adapted to receive an indicator of the beginning address of the circular buffer, an indicator of the current address pointer, and an indicator of the ending address of the circular buffer. The control circuit provides the output of the adder to the address pointer latch as an updated address pointer when the indicators take on predetermined values and the comparator output is in the second state. The control circuit provides the beginning address to the address pointer latch as an updated address pointer when the indicators take on predetermined values and the comparator output is in the first state. An advanced address pointer may be used to enhance performance in misaligned memory accesses.

DETAILED DESCRIPTION

Figure 1:
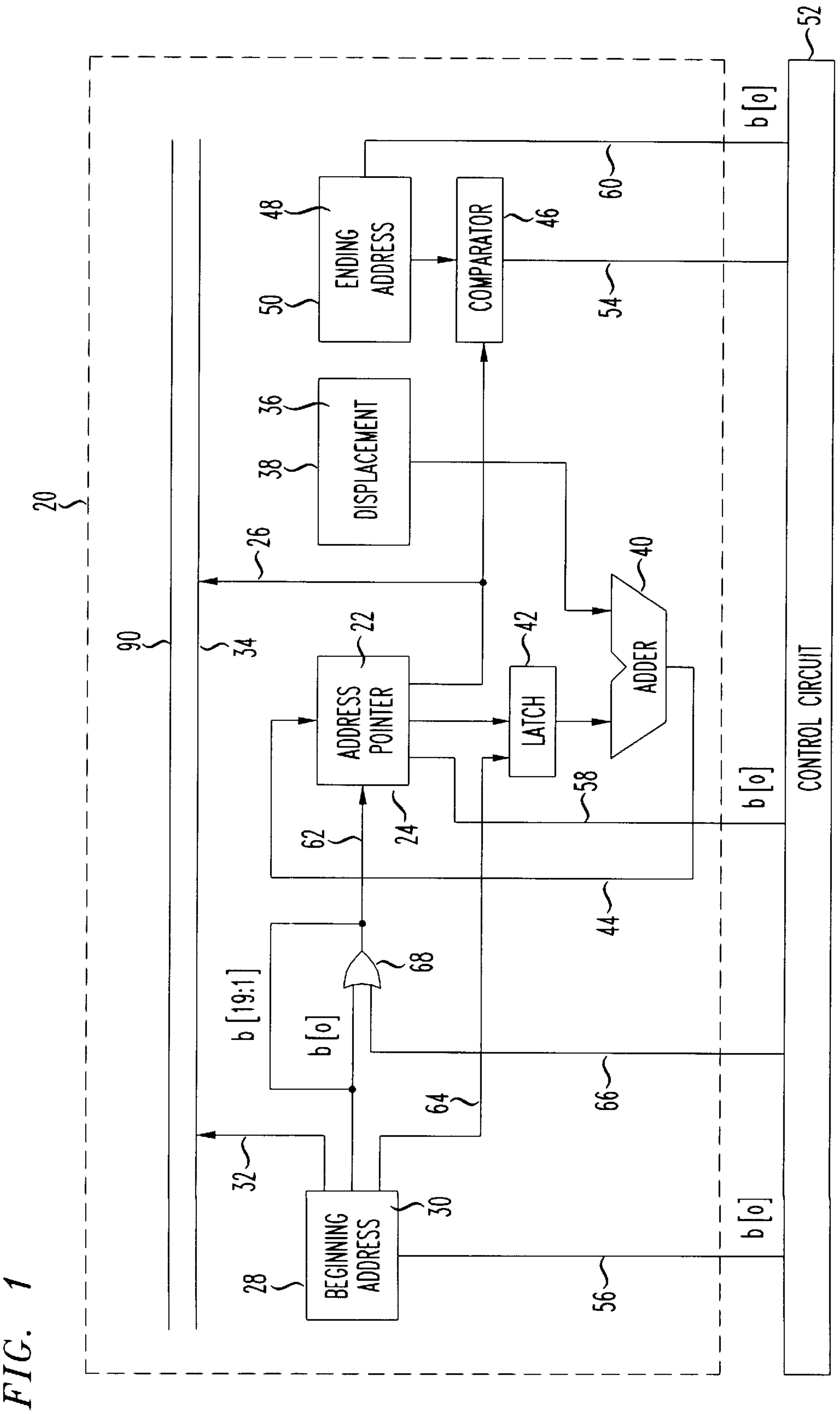
FIG. 1 is a portion of an address arithmetic unit in accordance with the invention along with a control circuit to control the address arithmetic unit.

FIG. 1 shows an address arithmetic unit (AAU) 520 controlled by a control circuit 52, in accordance with the present invention. The AAU shown in FIG. 1 assumes busses having multiple sources are driven by high impedance outputs, as is known in the art. The invention is not limited thereto. For example, multipliers could be employed to select inputs to drive busses. A circular buffer is addressed typically starting at the beginning address for increments and at the ending address for decrements. Each memory access causes an address, usually either the present address pointer 22 in address pointer latch 24 or another address such as the beginning address 28 in beginning address latch 30 of the circular buffer, to be placed on address bus 34. Address pointer 22 would be placed on address bus 34 over bus 26; beginning address 28 is placed on the address bus 34 over bus 32. Placing an address on the address bus for a memory access also initiates updating the address pointer 22 while the memory access is occurring, in preparation for a subsequent memory access. A displacement 36 in displacement latch 38 is used to step through addresses of the circular buffer in a selective manner that is user defined. Typically the displacement is a fixed value greater than one, but the invention is not limited thereto.

The present address pointer 24 is provided as a first input to adder 40. Latch 42 may be present to prevent a race condition as is known in the art. Displacement 36 is provided as a second input to adder 40. Adder 40 adds the two inputs when present and provides the sum as an output. The output from adder 40 is provided over bus 44 to address pointer latch 24 as an updated address pointer 22, overwriting the previous value of address pointer.

Address pointer 22 is also provided as a first input to comparator 46. Ending address 48 from ending address latch 50 is provided as a second input to comparator 46. Comparator 46 compares the first and second inputs, such as by a difference or bit-to-bit comparison as is known in the art, to determine if the inputs are the same. For multiple-word fetches, comparator 46 ignores the least significant bits as appropriate. For double-word fetches, comparator 46 ignores the least significant bit (LSB) of each input; for single word fetches comparator 46 does not ignore the LSB of the inputs. When the two inputs to comparator 46 are the same, comparator 46 provides an output to control circuit 52 over bus 54 that is a first logical state, such as one. When the two inputs to comparator 46 are not the same, comparator 46 provides an output to control circuit 52 over bus 54 that is a second logical state, such as zero.

Control circuit 52 receives the LSB of beginning address 30 from beginning address latch 28 over bus 56, the LSB address pointer 22 from address pointer latch 24 over bus 58, and the LSB of ending address 48 from ending address latch 50 over bus 60. A beginning address, ending address or address pointer that is even has an LSB that is zero, while an odd address or pointer has an LSB that is one. For multiple-word fetches, more bits than the LSB may be provided to control circuit 52. Control circuit 52 is a state machine that controls the other devices illustrated in FIG. 1, in a manner described below, depending on the state of the output of comparator 46 and the least significant bits of beginning address 30, address pointer 22, and ending address 48, to generate an updated address pointer. The beginning address 30 in beginning address latch 28 can be shifted into address pointer latch 24 over bus 62, overwriting the current address pointer 22, under the control of control circuit 52. One skilled in the art could design a state machine based on the description herein.

In a typical memory access, the address pointer will change by the displacement 36. When comparator 46 outputs a signal indicating the address pointer 22 is the same as the ending address 48, in combination with the indicators of the beginning address 30, address pointer 22 and ending address 48 such as the respective least significant bit, a wrap-around condition occurs and control circuit 52 shifts one of (1) beginning address 30 in beginning address latch 28, (2) one greater than the beginning address, or (3) two greater than the beginning address, into address pointer latch 24 as the updated address pointer 22. Providing one greater than the beginning address is achieved by providing beginning address 30 over bus 64, through latch 42 if present, as an input to adder 40. With displacement 36 set to one, the output of adder 40 is the beginning address plus one and is provided over bus 44 to address pointer latch 24 as the updated address pointer 22. Providing two greater than the beginning address as the updated address pointer is achieved in the same manner with displacement 36 set to two.

Figures 2, 3:
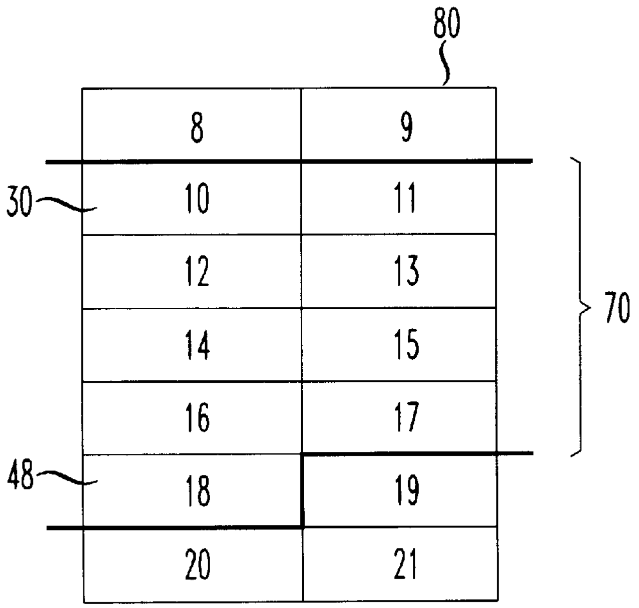
FIG. 2 is a table of beginning address, ending address and address pointer inputs to the control circuit of FIG. 1 designating each predetermined combination as a case.
FIG. 3 is a portion of a multiple word memory, defining a circular buffer, illustrating three combinations of beginning address, ending address and address pointer.

The eight possible combinations of the three least significant bits are tabulated in FIG. 2 and identified by a case number. The eight possible combinations of the three least significant bits correspond to the circular buffer beginning or ending at either an even or an odd address, accounting four circular buffer arrangements. For each circular buffer arrangement, the current address pointer can be either odd or even at the occurrence of a wrap condition. Thus, there are a total of eight wrap-around combinations that must be recognized and controlled by control circuit 52 for a double-word memory access to fetch two words at a time and remain within the bounds of the circular buffer being accessed. Each case will be described with focus on the condition indicating a modulo wrap and the control actions of control circuit 52.

Multiple-word fetches fetch more than one word of data each time memory is accessed. The description here will describe double-word fetches, although the invention is not limited thereto. The memory from which data is fetched can be any type of memory, including but not limited to read-only-memory (ROM), random access memory (RAM), and electrically-erasable, programmable, read-only memory (EEPROM). For double-word fetches, the memory is structured to store two words in each row of memory space. One word in each row has an odd address and the other word has an even address. Accessing one row of the memory by placing the address of the even word of memory on the address bus places two words on a data bus for transmission and use elsewhere in the processor. The data bus includes a low side or half for transmitting one of the words and a high side or half for transmitting the other word. For example, the word read from an even address could be transmitted on the low half of the bus and a word read from the odd address could be transmitted on the high half of the bus, or the reverse.

Case 1

Case 1 is illustrated in FIG. 3 with an even beginning address 30 of 10 and an even ending address 48 of 18 defining the boundaries of circular buffer 70 in memory 80. With address pointer 22 initially set, as is known in the art, to for example 10, the beginning address of the circular buffer, and a displacement set to two, as is known in the art, a sequence of memory access operations is described.

With address pointer 22 at 10, a double-word fetch memory access operation would retrieve data stored at memory locations 10 and 11. The address pointer is updated in AAU 520 as described above to be 12.

The subsequent memory access would retrieve data stored at memory locations 12 and 13. Again the address pointer is updated as described above by adding the displacement to the current address pointer, to be 14.

A subsequent memory access would retrieve data stored at memory locations 14 and 15. Again the address pointer is updated by adding the displacement to the current address pointer resulting in an updated address pointer of 16.

The data stored at memory locations 16 and 17 are retrieved in the subsequent memory access and the address pointer is updated to be another even value, 18.

In the above memory accesses, the output of comparator 46 as the address pointer is updated indicates the address pointer, upon initiation of a memory access, was not the same as the ending address of the circular buffer.

A subsequent memory access would provide the address pointer 22, having a value of 18, to comparator 46. Comparator 46, which also receives ending address 48 having a value of 18, determines, when comparing the inputs ignoring least significant bits thereof, that the inputs are the same and thus control circuit 52 should control a modulo wrap based on the beginning address, ending address, and address pointer.

In the illustrated double-word fetch example, the modulo wrap is based on the least significant bit of each of the beginning address, ending address, and address pointer. Memory location 18 is within circular buffer 70 and valid data, such as a word, is retrieved therefrom. Memory location 19 is not within circular buffer 70 and data is not retrieved therefrom. Instead, based on the combination of LSB's of the beginning address, ending address, and address pointer, data is retrieved from the memory location indicated by the current address pointer, the memory location at ending address 48, memory location 18, and the memory location at the beginning address 30, having a value of 10, of the circular buffer. Since both memory locations 10 and 18 are even memory locations and thus data retrieved therefrom would normally be transferred on one side of the data bus, logic circuitry, not shown, shifts one of the two words to be transmitted onto the other half of the data bus.

Updating address pointer 22 from a value of 18 is also controlled by control circuit 52 based on the combination of LSB's of the beginning address, ending address, and address pointer. Address pointer 22 needs to be updated to be one greater than the beginning address of the circular buffer. While the update could be achieved by providing the beginning address to adder 40 and changing the displacement to one then adding the displacement to the beginning address and storing the resulting address in address pointer latch 24, the same updated address pointer or address pointer value can be generated in a different manner. Upon the occurrence of a modulo wrap condition with even beginning address, even ending address and even address pointer, control circuit 52 provides the beginning address, with the LSB forced to be one, to address pointer latch 24 as an updated address pointer 22. In this manner, the value of the updated address pointer is forced to be an odd value that is one greater than the beginning address of circular buffer 70 which is even. No addition is required.

The LSB is forced to be one in the following manner. All but the LSB of the beginning address 30 are passed from beginning address latch 30 to address pointer latch 24 over bus 62. The LSB provides a first input to OR gate 68. Line 66 from control circuit 52 provides a second input to OR gate 68. When a modulo wrap condition exists with an even beginning address, even ending address and even address pointer, control circuit 52 provides a logic one as the second input to OR gate 68 over bus 66. The LSB of the beginning address, as provided to address pointer latch 24 as an updated address pointer 22 is assured to be a one. The updated address pointer is thus an odd value that is one greater than the beginning address of circular buffer 70.

The updated address pointer in the example has a value of 11. With address pointer 22 at 11, a double-word fetch memory access operation would be misaligned and retrieve data stored at memory locations 11 and 12. The address pointer is updated by adding the displacement to the current address pointer resulting in an updated address pointer of 13.

A subsequent memory access would retrieve data stored at memory locations 13 and 14. Again the address pointer is updated by adding the displacement to the current address pointer to be 15.

A subsequent memory access would retrieve data stored at memory locations 15 and 16. The address pointer is updated by adding the displacement to the current address pointer resulting in an updated address pointer of 17.

A subsequent memory access would retrieve data stored at memory locations 17 and 18. This is Case 2, discussed further below.

Case 2

Case 2, with an even beginning address 30 such as 10 and an even ending address 48 such as 18 defining the boundaries of circular buffer 70 is also illustrated in FIG. 3. Case 2 occurs when address pointer 22 is odd and comparator 46 output indicates a modulo wrap condition. This occurs every other pass through circular buffer 70 as illustrated in FIG. 3, with a Case 1 modulo wrap condition occurring on the other passes through circular buffer 70.

Address pointer 22 has a value of 17 during the memory access that retrieves data stored at memory locations 17 and 18. Since the address pointer value of 17 does not match the ending address of 18 as compared by comparator 46, a modulo wrap condition does not occur during the memory access where the address pointer has a value of 17. Thus the address pointer is updated by adding the displacement to the current address pointer resulting in an updated address pointer of 19. Note that the last valid data has been retrieved from circular buffer 70, but a modulo wrap condition has not occurred.

A subsequent memory access with address pointer 22 having a value of 19 compares address pointer 22 having a value of 19 to ending address 48 in comparator 46, ignoring the least significant bits of the inputs, determines that the inputs are the same and thus control circuit 52 should control a modulo wrap based on the beginning address, ending address and address pointer. In the illustrated double-word fetch example, the modulo wrap is based on the least significant bit of each of the beginning address, ending address, and address pointer.

With an even beginning address, an even ending address and an odd address pointer when a modulo wrap condition is indicated by comparator 46, control circuit 52 causes the beginning address 30 from beginning address latch 28 to be placed on address bus 34 over bus 32, and beginning address 30 to also be provided as an input to adder 40 over bus 64. Placing beginning address 30 on address bus 34 is part of a memory access that retrieves data stored at memory locations 10 and 11. Providing beginning address 30 to adder 40 causes address pointer 22 to be updated by adding the displacement, which is two for this example, to the beginning address to generate an updated address pointer of two greater than beginning address 30 which is provided to address pointer latch 24 over bus 44. Note the latest memory access returns the memory access process to a Case 1 operation.

Case 3

Figure 4:
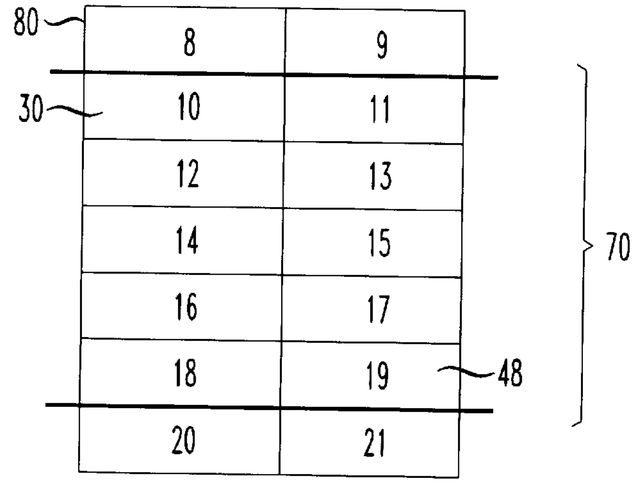
FIG. 4 is a portion of a multiple word memory, defining a circular buffer, illustrating another combination of beginning address, ending address and address pointer.

Case 3 is illustrated in FIG. 4 with an even beginning address 30 and an odd ending address 48 defining the boundaries of circular buffer 70. In the example of this case, beginning address 30 is 10 and ending address 48 is 19. This case of memory access operations operates initially as Case 1. With address pointer 22 initially set to 10 and a displacement set to two, a double-word fetch memory access operation with address pointer 22 having a value of 10 retrieves data stored at memory locations 10 and 11. The address pointer is updated in AAU 520 as described above to be 12. With address pointer 22 having a value of 12, data stored at memory locations 12 and 13 are retrieved in a memory access operation and address pointer 22 is updated to be 14. With address pointer 22 having a value of 14, data stored at memory location 14 and 15 are retrieved in a memory access operation and address pointer 22 is updated to be 16. With address pointer 22 having a value 16, data stored at memory locations 14 and 15 are retrieved in a memory access operation and address pointer 22 is updated to be 18.

A subsequent memory access retrieves data stored at memory locations 16 and 17 and provides the address pointer 22, having a value of 18, to comparator 46. Comparator 46, which also receives ending address 48 having a value of 19, determines, when comparing the inputs ignoring the least significant bits thereof, that the inputs are the same and thus control circuit 52 should control a modulo wrap based on the beginning address, ending address, and address pointer. In the illustrated double-word fetch example, the modulo wrap is based on the least significant bit of each of the beginning address, ending address, and address pointer.

With an even beginning address, odd ending address, and even address pointer when a modulo wrap condition is indicated by comparator 46, control circuit 52 causes the beginning address 30 to be provided over bus 62 as the updated address pointer 22 stored in address pointer latch 24. With address pointer 22 set to the beginning address 30, a subsequent memory access operation will retrieve data stored in memory locations 10 and 11 (the first two memory locations in circular buffer 70) and update address pointer 22 to be 12. Note the latest memory access returns the memory access process to the beginning of the description of Case 3. In Case 3, memory accesses always remain aligned.

Case 4

Figure 5:
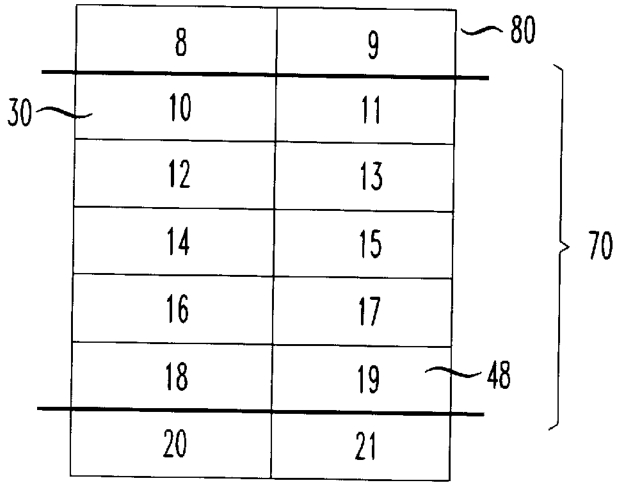
FIG. 5 is a portion of a multiple word memory, defining a circular buffer, illustrating another combination of beginning address, ending address and address pointer.

Case 4 is illustrated in FIG. 5 with an even beginning address and an odd ending address defining the boundaries of circular buffer 70. In the example of Case 4, beginning address 30 is 10, ending address 48 is 19, address pointer 22 is initially set to an odd address such as 11, and displacement is set to two. Case 4 is similar to Case 3 except the address pointer is always odd, and memory accesses are always misaligned.

A double-word fetch memory access operation with address pointer 22 having a value of 11 retrieves data stored at memory locations 11 and 12. The address pointer is updated in AAU 520 by adding displacement to the current address pointer 22 value of 11 in adder 40 to generate an updated address pointer 22 having a value of 13. With address pointer 22 having a value of 13, data stored at memory locations 13 and 14 are retrieved in a memory access operation and address pointer 22 is updated to be 15. With address pointer 22 having a value of 15, data stored at memory locations 15 and 16 are retrieved in a memory access operation and address pointer 22 is updated to be 17. With address pointer 22 having a value of 17, data stored at memory locations 17 and 18 are retrieved in a memory access operation and address pointer 22 is updated to be 19.

A subsequent memory access provides address pointer 22, having a value of 19 to comparator 46. Comparator 46, which also receives ending address 48 having a value of 19, determines, when comparing the inputs ignoring the least significant bits thereof, that the inputs are the same and thus control circuit 52 should control a modulo wrap based on the beginning address, ending address, and address pointer. In the illustrated double-word fetch example, the modulo wrap is based on the least significant bit of each of the beginning address, ending address, and address pointer.

With an even beginning address, odd ending address and odd address pointer when a modulo wrap condition is indicated by comparator 46, control circuit 52 causes data to be retrieved from the memory location indicated by the current address pointer—which is the ending address 48 of the circular buffer, memory location 19—and the memory location at the beginning address 30 of the circular buffer, memory location 10. The data is assembled for transmission over the data bus and may require more than one memory access. Address pointer 22 is updated to be one greater than the beginning address 30 of the circular buffer, such as by shifting the beginning address over bus 62 into address pointer latch 24 forcing the LSB to be one as described above under Case 1. Note the latest memory access returns the memory access process to the beginning of the description of Case 4. In Case 4, memory accesses always remain misaligned.

Case 5

Figure 6:
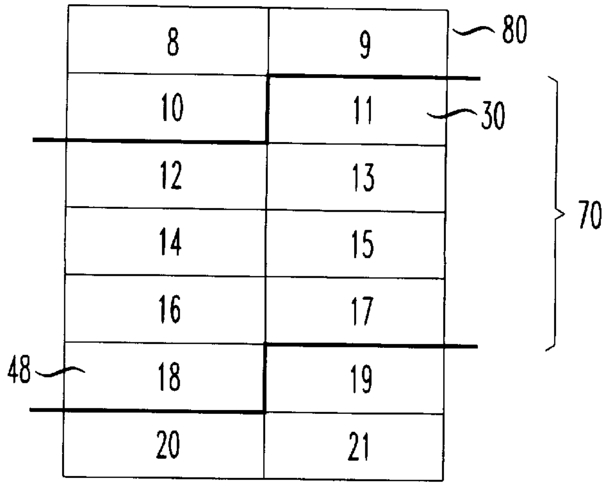
FIG. 6 is a portion of a multiple word memory, defining a circular buffer, illustrating another combination of beginning address, ending address and address pointer.

Case 5 is illustrated in FIG. 6 with an odd beginning address and an even ending address defining the boundaries of circular buffer 70. In the example of Case 5, beginning address 30 is 11, ending address 48 is 18, address pointer 22 is initially set to an even address such as 12, and displacement is set to two.

A double-word fetch memory access operation with address pointer 22 having a value of 12 retrieves data stored at memory locations 12 and 13. The address pointer is updated in AAU 520 by adding displacement to the current address pointer 22 value of 12 in adder 40 to generate an updated address pointer 22 having a value of 14. With address pointer 22 having a value of 14, data stored at memory locations 14 and 15 are retrieved in a memory access operation and address pointer 22 is updated in AAU 520 by adding displacement to the current address pointer 22 value of 14 to generate an updated address pointer 22 having a value of 16. With an address pointer 22 having a value of 16, data stored at memory locations 16 and 17 are retrieved in a memory access operation and address pointer 22 is updated to be 18.

A subsequent memory access provides address pointer 22, having a value of 18 to comparator 46. Comparator 46, which also receives ending address 48 having a value of 18, determines, when comparing the inputs ignoring the least significant bits thereof, that the inputs are the same and thus control circuit 52 should control a modulo wrap based on the beginning address, ending address, and address pointer. In the illustrated double-word fetch example, the modulo wrap is based on the least significant bit of each of the beginning address, ending address, and address pointer.

With an odd beginning address, even ending address and even address pointer when a modulo wrap condition is indicated by comparator 46, control circuit 52 causes data to be retrieved from the memory location indicated by the current address pointer—which is the ending address 48 of the circular buffer, memory location 18—and the memory location at the beginning address 30 of the circular buffer, memory location 11. More than one memory access may be required and the data is assembled for transmission over the data bus. Address pointer 22 is updated to be one greater than the beginning address 30 of circular buffer 70 by providing beginning address 30 having a value of 11 to adder 40 over bus 64 as a first input, and a displacement of 1 to adder 40 s a second input. The sum output from adder 40 is an updated address pointer 22 having a value one greater than the beginning address 30 (12 in the example) is passed over bus 44 and stored in address pointer latch 24.

Case 6

Figure 7:
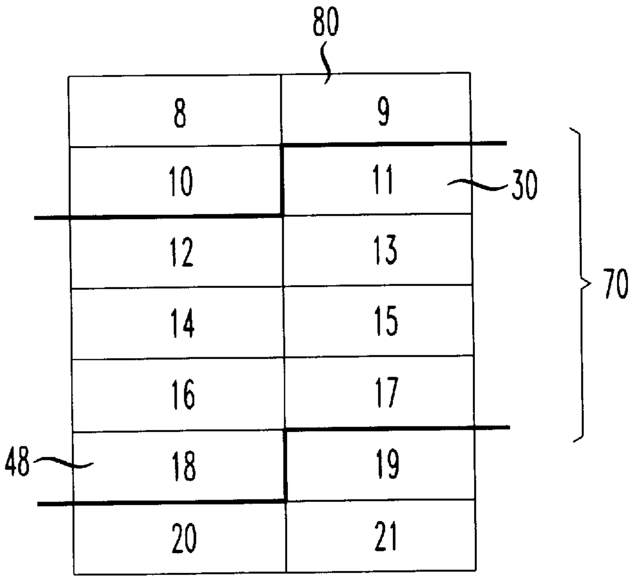
FIG. 7 is a portion of a multiple word memory, defining a circular buffer, illustrating another combination of beginning address, ending address and address pointer.

Case 6 is illustrated in FIG. 7 with an odd beginning address and an even ending address defining the boundaries of circular buffer 70. In the example of Case 6, beginning address 30 is 11, ending address 48 is 19, address pointer 22 is initially set to an odd address such as 11, and displacement is set to two.

A double-word fetch memory access operation with address pointer 22 having a value of 11 retrieves data stored at memory locations 11 and 12, a misaligned memory access. The address pointer is updated in AAU 520 by adding displacement to the current address pointer 22 value of 11 in adder 40 to generate an updated address pointer 22 having a value of 13. With address pointer 22 having a value of 13, data stored at memory locations 13 and 14 are retrieved in a memory access operation and address pointer 22 is updated to be 15. With address pointer 22 having a value of 15, data stored at memory locations 15 and 16 are retrieved in a memory access operation and address pointer 22 is updated to be 17.

A subsequent memory access provides address pointer 22, having a value of 17, to comparator 46. Comparator 46, which also receives ending address 48 having a value of 18, determines when comparing the inputs ignoring the least significant bits thereof, that the inputs are not the same and a modulo wrap should not occur. Data stored at memory locations 17 and 18 are retrieved in a misaligned memory access operation and address pointer 22 is updated to be 19.

A subsequent memory access provides address pointer 22, having a value of 19, to comparator 46. Comparator 46, which also receives ending address 48 having a value of 18, determines when comparing the inputs ignoring the least significant bits thereof, that the inputs are the same and control circuit 52 should control a modulo wrap based on the beginning address, ending address, and address pointer. In the illustrated double-word fetch example, the modulo wrap is based on the least significant bit of each of the beginning address, ending address, and address pointer.

With an odd beginning address, even ending address and odd address pointer when a modulo wrap condition is indicated by comparator 46, control circuit 52 causes data to be retrieved from the memory location at the beginning address 30 of circular buffer 70, and the memory location at one greater than the beginning address 30. This is achieved by passing the beginning address 30 over bus 62 into address pointer latch 24 with a logic low on bus 66 thereby allowing the LSB of the beginning address, as well as all other bits of the beginning address, to pass to address pointer latch 24 unchanged. Note the latest memory access returns the memory access process to the beginning of the description of Case 6.

Case 7

Figure 8:
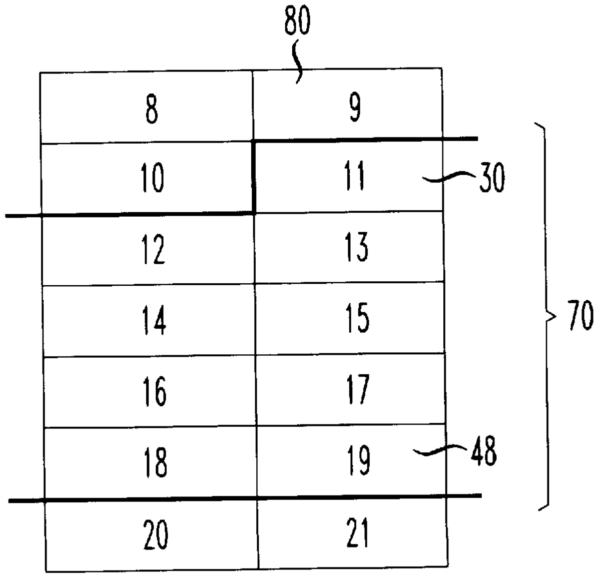
FIG. 8 is a portion of a multiple word memory, defining a circular buffer, illustrating another combination of beginning address, ending address and address pointer.

Case 7 is illustrated in FIG. 8 with an odd beginning address and an odd ending address defining the boundaries of circular buffer 70. In the example of Case 7, beginning address 30 is 11, ending address 48 is 19, address pointer 22 is initially set to an even address such as 16, and displacement is set to two.

A double-word fetch memory access operation with address pointer 22 having a value of 16 retrieves data stored at memory location 16 and 17, an aligned memory access. The address pointer is updated in AAU 520 by adding displacement to the current address pointer value of 16 in adder 40 to generate an updated address pointer 22 having a value of 18.

A subsequent memory access provides address pointer 22, having a value of 18, to comparator 46. Comparator 46, which also receives ending address 48 having a value of 19, determines when comparing the inputs ignoring the least significant bits thereof, that the inputs are the same and control circuit 52 should control a modulo wrap based on the beginning address, ending address, and address pointer. In the illustrated double-word fetch example, the modulo wrap is based on the least significant bit of each of the beginning address, ending address, and address pointer.

With an odd beginning address, odd ending address and even address pointer when a modulo wrap condition is indicated by comparator 46, control circuit 52 causes data to be retrieved in an aligned double-word memory access from the memory location indicated by the current address pointer. In the example of Case 7 given here, data is fetched from memory locations 18 and 19. Address pointer 22 is updated to be the beginning address 30 of circular buffer 70. Address pointer 22 is updated by passing beginning address 30 over bus 62 into address pointer latch 24 with a logic low on bus 66 thereby allowing the LSB of the beginning address to pass to address pointer latch 24 unchanged.

Case 8

Case 8 is also illustrated in FIG. 8 with an odd beginning address and an odd ending address defining circular buffer 70. In the example of Case 8, beginning address 30 is 11, ending address 48 is 19, displacement is set to two and address pointer is set to an odd address upon the occurrence of a modulo wrap condition.

A double-word fetch memory access operation with address pointer 22 having a value of 17 retrieves data stored at memory locations 17 and 18, a misaligned memory access, assembles the data and transmits the data over a data bus. The address pointer is updated in AAU 520 by adding displacement to the current address pointer value of 17 in adder 40 to generate an updated address pointer 22 having a value of 19.

With an odd beginning address, odd ending address and odd address pointer when a modulo wrap condition is indicated by comparator 46, control circuit 52 causes data to be retrieved from the memory location indicated by the current address pointer and the beginning address of circular buffer 70. The current address pointer has a value of 19 and the beginning address 30 is 11. The data is assembled for transmission over the data bus and may require more than one memory access. Address pointer 22 is updated to be one greater than the beginning address 30 of the circular buffer such as by providing beginning address 30 to adder 40, as a first input, over bus 64 and providing a displacement of one to adder 40 as a second input. The sum output from adder 40 is the updated address ponier 22 which is provided to address pointer latch 24 over bus 44.

The AAU and control circuits described above can accommodate either single-word memory accesses or double-word memory accesses. For single-word memory accesses, displacement is set to one, so that data is accessed sequentially. For double-word memory access, displacement is set to two so that two words are fetched each memory access.

As described above, double-word memory fetches require one cycle when aligned, and two cycles when misaligned. In addition, each modulo wrap operation requires one (when aligned and remaining aligned) or two cycles to complete.

Figure 9:
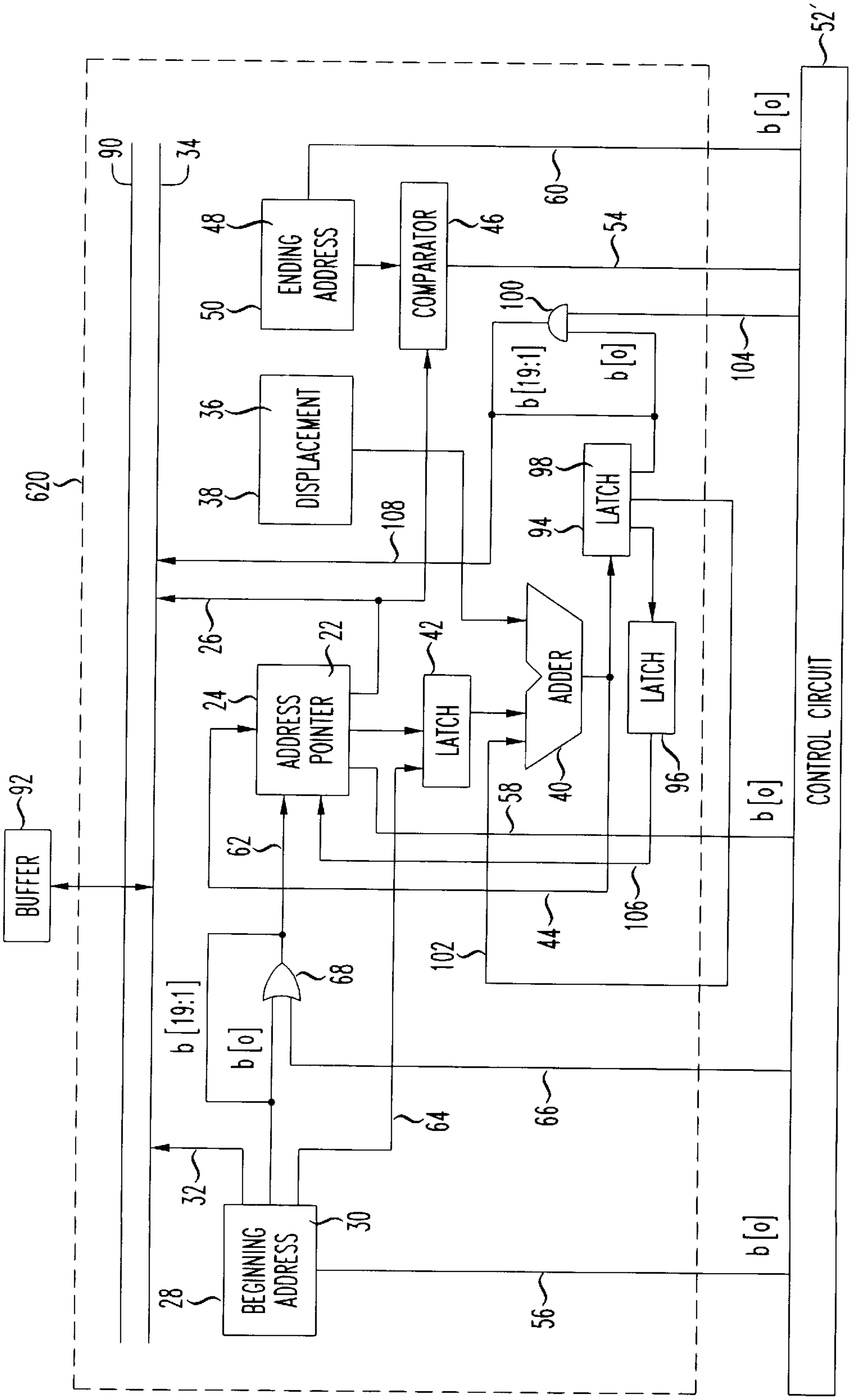
FIG. 9 is a portion of an alternate embodiment address arithmetic unit.

An alternate embodiment address arithmetic unit 620 is shown in FIG. 9 in which on the first occurrence of a misaligned double-word memory access, two cycles are required to initialize the address arithmetic unit and one cycle is required for each sequential double-word memory access thereafter for misaligned fetches. This can be achieved using a single adder 40 as illustrated in FIG. 9.

Upon detecting an initial double-word memory access, the misaligned fetch is executed in two cycles. The first memory access, which is a single-word access, retrieves a first word and assembles it for transmission on data bus 90. During the first memory access, the current address pointer 22 is placed on address bus 34 by way of bus 26, and displacement 36 is added to the current address pointer 22 to produce an updated address pointer. The updated address pointer is provided both to address pointer latch 24 and misalign address latch 94.

The second memory access is a double-word fetch, even though only a single word is necessary to meet the requirements of the misaligned double-word memory access being executed. The two words fetched are split with the word having a higher address stored in a temporary register or data buffer 92 for potential use in a subsequent misaligned memory access. During the second memory access, the advanced address 98 stored in misaligned address latch 94 is placed on address bus 34 by way of bus 108 with the least significant bit forced to be zero by AND gate 100. AND gate 100 receives as a first input bit zero of the advanced address 98 and receives as a second input over bus 104 a signal from control circuit 52' that is a logic low at the input of AND gate 100. In this manner the output of AND gate 100 is assured to be a logic zero. The advanced address 98 with the least significant bit forced to be zero provides the memory address that is placed on bus 34 and from which data is retrieved.

Misalignment is detected by the indicator of address pointer 22 which is the least significant bit for double-word memory accesses. The word having a lower address is assembled with the data read from the previous memory access and transmitted over data bus 90. In this process, with the initial memory access to obtain the first data word in the misaligned memory access, the updated address pointer output from adder 40 is provided not only to address pointer latch 24 over bus 44 but also to a misaligned address latch 94 where it is stored. Control circuit 52' provides the updated address pointer 22 to adder 40 over bus 102 as a first input and the displacement, which is 2, to adder 40 as a second input. Adder 40 adds the inputs to provide an advanced address 98 as an output from adder 40. The advanced address 98 output is provided to misalign address latch 94 where the advanced address 98 is two greater than the address pointer 24 stored in address pointer latch 22.

On a subsequent misaligned fetch, the advanced address 98 stored in misaligned address latch 94 is placed on address bus 34 with the least significant bit forced to be zero by AND gate 100. AND gate 100 receives as a first input bit zero of the advanced address 98 and receives as a second input over bus 104 a signal from control circuit 52' that is a logic low at the input of AND gate 100. In this manner the output of AND gate 100 is assured to be a logic zero. The advanced address 98 with the least significant bit forced to be zero provides the memory address that is placed on bus 34 and from which data is retrieved. Once the advanced address 98 stored in misaligned address latch 94 has been initialized to be two greater than address pointer 22, each contiguous, subsequent misaligned double-word memory access, as controlled by control circuit 52' , places advanced address 98 stored in misaligned address latch 94 on the address bus and provides advanced address 98 over bus 106 as an updated address pointer 22 to address pointer latch 24 by way of race eliminating delayed misaligned address latch 96. Adder 40 receives advanced address 98 and displacement 36 as inputs and provides an output that updates advanced address pointer 98 in misaligned advanced address pointer or maintain the advanced address pointer at two greater than the address pointer 22. In this manner, the advanced address pointer 98 value is copied to the address pointer 22, over bus 106 by way of delayed misaligned address latch 96. Only one adder is required to update both the advanced address pointer 98 and address pointer 22 because the advanced address pointer value is shifted into address pointer latch 24 as well as being placed onto address bus 34 such that only the advanced address pointer requires an addition operation to be updated. Thus, for the eight cases described above, every case that performs a sequential fetch that is misaligned can invoke the advanced address pointer. The advantage of invoking the advanced address pointer is that subsequent contiguous misaligned double-word memory accesses execute in a single cycle, rather than requiring two cycles.

While the invention has been described as controlling the modulo wrap based on the least significant bit of each of the beginning address, ending address and address pointer, the invention is not limited thereto. A double-word fetch uses the least significant bit as an indicator to determine, when a modulo wrap condition occurs, which control action or actions are to be taken. Multiple word fetches greater than two words may require a greater number of bits as an indicator to distinguish among the required control actions.

While the invention has been described as incrementing the address pointer, the invention is not limited thereto. The invention also applies to decrementing the address pointer, as conceptually would occur by reversing the beginning and ending addresses of the circular buffer.

The invention claimed is:

1. A circuit for generating an updated address pointer, comprising:

an address pointer latch adapted to retain a current address pointer;

an adder adapted to receive the current address pointer as a first input and a displacement as a second input, the adder adapted to add the inputs to provide an output;

a comparator adapted to receive as a first input the current address pointer and as a second input an ending address of a circular buffer, the comparator adapted to compare the first and second inputs ignoring least significant bits thereof when the displacement is greater than one, the comparator adapted to provide an output that is a first state when the inputs are the same and an output that is a second state when the inputs are different; and a control circuit, the control circuit adapted to receive an indicator of a beginning address of the circular buffer, an indicator of the current address pointer, and an indicator of the ending address of the circular buffer the control circuit adapted to provide the beginning address to the address pointer latch as an updated address pointer when the comparator output is in the first state, the control circuit adapted to provide the output of the adder to the address pointer latch as an updated address pointer when the indicators take on predetermined values and the comparator output is in the second state.

2. The circuit as recited in claim 1, wherein at least one of the indicators is a least significant bit of a representation.

3. The circuit as recited in claim 1, further comprising:

an advanced address pointer adapted to receive the adder output, the advanced address pointer capable of providing an output to an address bus and to the address pointer latch, the address pointer adapted to receive the output of the advanced address pointer.

4. A circuit for generating an updated address pointer, comprising:

an address pointer latch adapted to retain a current address pointer;

an adder adapted to receive the current address pointer as a first input and a displacement as a second input, the adder adapted to add the inputs to provide an output;

a comparator adapted to receive as a first input the current address pointer and as a second input an ending address of a circular buffer, the comparator adapted to compare the first and second inputs ignoring least significant bits thereof when the displacement is greater than one, the comparator adapted to provide an output that is a first state when the inputs are the same and an output that is a second state when the inputs are different;

a control circuit, the control circuit adapted to receive an indicator of a beginning address of the circular buffer, and indicator of the current address pointer, and an indicator of the ending address of the circular buffer the control circuit adapted to provide the beginning address to the address pointer latch as an updated address pointer when the comparator output is in the first state, the control circuit adapted to provide the output of the adder to the address pointer latch as an updated address pointer when the indicators take on predetermined values and the comparator output is in the second state; and a bit control circuit, the bit control circuit adapted to receiver the beginning address and adapted to cause a least significant bit thereof to take on a predetermined state to produce a modified beginning address, the bit control circuit adapted to provide the modified beginning address to the address pointer.

5. The circuit as recited in claim 2, wherein the indicators are a least significant bit of a representation of the respective address and pointer.

6. The circuit as recited in claim 4, wherein at least one of the indicators is a least significant bit of a representation.

7. The circuit as recited in claim 4, further comprising:

an advanced address pointer adapted to receive the adder output, the advanced address pointer capable of providing an output to an address bus and to the address pointer latch, the address pointer adapted to receive the output of the advanced address pointer.

8. A circuit for generating an updated address pointer, comprising:

an address pointer latch adapted to retain a current address pointer;

an adder adapted to receive the current address pointer as a first input and a displacement as a second input, the adder adapted to add the inputs to provide an output;

a comparator adapted to receive as a first input the current address pointer and as a second input an ending address of a circular buffer, the comparator adapted to compare the first and second inputs ignoring least significant bits thereof when the displacement is greater than one, the comparator adapted to provide an output that is a first state when the inputs are the same and an output that is a second state when the inputs are different;

a control circuit, the control circuit adapted to receive an indicator of a beginning address of the circular buffer, an indicator of the current address pointer, and an indicator of the ending address of the circular buffer, at least one of the indicators being a least significant bit, the least significant bits providing eight possible combinations, and the least significant bit taking on any one of the possible combinations, the control circuit adapted to provide the beginning address to the address pointer latch as an updated address pointer when the comparator output is in the first state, the control circuit adapted to provide the output of the adder to the address pointer latch as an updated address pointer when the indicators take on predetermined values and the comparator output is in the second state.

9. The circuit as recited in claim 8, further comprising:

an advanced address pointer adapted to receive the adder output, the advanced address pointer capable of providing an output to an address bus and to the address pointer latch, the address pointer adapted to receive the output of the advance address pointer.

10. A method of generating an updated address pointer, comprising the steps of:

defining a current address pointer, a beginning address and an ending address;

adding a displacement to the current address pointer to produce a sum that is a potential updated address pointer;

comparing the current address pointer to the ending address ignoring least significant bits thereof when the displacement is greater than one;

detecting a state of each of the beginning address, current address pointer, and ending address;

replacing the current address pointer with the beginning address when the beginning address, current address pointer, and ending address take on predetermined states and the current address pointer is the same as the ending address; and replacing the current address pointer with the potential updated address pointer when the beginning address, current address pointer, and ending address take on predetermined states and the current address pointer is not the same as the ending address.

11. A method of generating an updated address pointer comprising:

defining a current address pointer, a beginning address and an ending address;

adding a displacement to the current address pointer to produce a sum that is a potential updated address pointer;

comparing the current address pointer to the ending address ignoring least significant bits thereof when the displacement is greater than one;

detecting as odd or even a state of each of the beginning address, current address pointer, and ending address;

replacing the current address pointer with the beginning address when the beginning address, current address pointer, and ending address take on predetermined states and the current pointer is the same as the ending address; and replacing the current address pointer with the potential updated address pointer when the beginning address, current address pointer, and ending address take on predetermined states and the current address pointer is not the same as the ending address.

12. A method of generating an updated address pointer comprising the steps of:

defining a current address pointer, a beginning address and an ending address;

adding a displacement to the current address pointer to produce a sum that is a potential updated address pointer;

comparing the current address pointer to the ending address ignoring least significant bits thereof when the displacement is greater than one;

detecting an odd or even state of each of the beginning address, current address pointer, and ending address;

replacing the current address pointer with the beginning address when the beginning address, current address pointer, and ending address take on predetermined states and the current address pointer is not the same as the ending address;

replacing the current address pointer with the potential updated address pointer when the beginning address, current address pointer, and ending address take on predetermined states and the current address pointer is not the same as the ending address; and modifying the beginning address to cause a least significant bit thereof to take on a predetermined state prior to providing the beginning address to the address pointer.

13. A method of generating an updated address pointer, comprising:

defining a current address pointer, a beginning address pointer, an ending address, and an advanced address pointer;

adding a displacement to the current address pointer to produce a sum that is a potential address pointer;

adding a displacement to the potential address pointer to produce a sum that is an advanced address pointer;

shifting the advanced address pointer into the current address pointer;

comparing the ending address ignoring least significant bits thereof when the displacement is greater than one;

detecting a state of each of the beginning address, current address pointer, and ending address;

replacing the current address pointer with the beginning address when the beginning address, current address pointer, and ending address take on predetermined states and the current address pointer is the same as the ending address; and replacing the current address pointer with the potential updated address pointer when the beginning address, current address pointer, and ending address take on predetermined states and the current address pointer is not the same as the ending address.

14. A method of generating an updated address pointer comprising:

defining a current address pointer, a beginning address pointer, an ending address, and an advanced address pointer;

adding a displacement to the current address pointer to produce a sum that is a potential address pointer;

adding a displacement to the potential address pointer to produce a sum that is an advanced address pointer;

shifting the advanced address pointer into the current address pointer;

comparing the ending address ignoring least significant bits thereof when the displacement is greater than one;

detecting an odd or even state of each of the beginning address, current address pointer, and ending address;

replacing the current address pointer with the beginning address when the beginning address, current address pointer, and ending address take on predetermined states and the current address pointer is the same as the ending address; and replacing the current address pointer with the potential updated address pointer when the beginning address, current address pointer, and ending address take on predetermined states and the current address pointer is not the same as the ending address.

15. A method of generating an updated address pointer comprising:

defining a current address pointer, a beginning address pointer, and ending address, and an advanced address pointer;

adding a displacement to the current address pointer to produce a sum that is a potential address pointer;

adding a displacement to the potential address pointer to produce a sum that is an advanced address pointer;

shifting the advanced address pointer into the current address pointer;

comparing the ending address ignoring least significant bits thereof when the displacement is greater than one;

detecting a state of each of the beginning address, current address pointer, and ending address;

replacing the current address pointer with the beginning address when the beginning address, current address pointer, and ending address take on predetermined states and the current address pointer is the same as the ending address; and replacing the current address pointer with the potential updated address pointer when the beginning address, current address pointer, and ending address take on predetermined states and the current address pointer is not the same as the ending address; and modifying the beginning address to assure a least significant bit thereof takes on a predetermined state prior to providing the beginning address to the address pointer.

* * * * *